United States Patent
Chae et al.

(10) Patent No.: US 9,713,124 B2
(45) Date of Patent: Jul. 18, 2017

(54) METHOD AND APPARATUS FOR TRANSMITTING SIGNAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR); Hakseong Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/904,413

(22) PCT Filed: Jul. 14, 2014

(86) PCT No.: PCT/KR2014/006309
§ 371 (c)(1),
(2) Date: Jan. 11, 2016

(87) PCT Pub. No.: WO2015/005742
PCT Pub. Date: Jan. 15, 2015

(65) Prior Publication Data
US 2016/0150504 A1 May 26, 2016

Related U.S. Application Data

(60) Provisional application No. 61/845,381, filed on Jul. 12, 2013, provisional application No. 61/856,062, (Continued)

(51) Int. Cl.
*H04B 1/713* (2011.01)
*H04L 5/00* (2006.01)
(Continued)

(52) U.S. Cl.
CPC ............ *H04W 72/04* (2013.01); *H04B 1/713* (2013.01); *H04L 5/0012* (2013.01);
(Continued)

(58) Field of Classification Search
CPC ... H04W 72/02; H04W 72/04; H04W 76/021; H04W 76/023; H04B 1/713; H04L 5/0012; H04L 5/0033; H04L 5/0044
See application file for complete search history.

(56) References Cited

U.S. PATENT DOCUMENTS

| | | | |
|---|---|---|---|
| 2010/0189032 | A1 | 7/2010 | Chen et al. |
| 2011/0194510 | A1 | 8/2011 | Gaal et al. |

(Continued)

FOREIGN PATENT DOCUMENTS

| | | |
|---|---|---|
| CN | 102958133 | 3/2013 |
| CN | 102972061 | 3/2013 |

(Continued)

OTHER PUBLICATIONS

PCT International Application No. PCT/KR2014/006309, Written Opinion of the International Searching Authority dated Oct. 22, 2014, 16 pages.

(Continued)

*Primary Examiner* — David B Lugo
(74) *Attorney, Agent, or Firm* — Lee, Hong, Degerman, Kang & Waimey (57) ABSTRACT

One embodiment of the present invention relates to a method for transmitting a device-to-device (D2D) signal from a first user equipment in a wireless communication system, wherein the signal transmission method comprises the steps of: deciding a physical resource block through frequency-hopping; and mapping data onto the physical resource block that is decided, wherein a hopping offset value common to a first cell and a second cell is used for the (Continued)

frequency-hopping, when a second user equipment for receiving the signal belongs to the second cell, which is not the first cell to which the first user equipment belongs.

14 Claims, 8 Drawing Sheets

Related U.S. Application Data filed on Jul. 19, 2013, provisional application No. 61/872,757, filed on Sep. 1, 2013.

(51) Int. Cl.
*H04W 72/04* (2009.01)
*H04W 76/02* (2009.01)
*H04W 72/02* (2009.01)

(52) U.S. Cl.
CPC ............ *H04L 5/0044* (2013.01); *H04W 72/02* (2013.01); *H04W 76/021* (2013.01); *H04W 76/023* (2013.01); *H04L 5/0033* (2013.01)

(56) References Cited

U.S. PATENT DOCUMENTS

| | | | | |
|---|---|---|---|---|
| 2012/0117155 A1* | 5/2012 | Li | ........................ | G06Q 10/10 709/205 |
| 2013/0039324 A1 | 2/2013 | Kwon et al. | | |
| 2013/0083749 A1 | 4/2013 | Xu et al. | | |
| 2013/0114570 A1 | 5/2013 | Park et al. | | |
| 2014/0004867 A1* | 1/2014 | Noh | ..................... | H04W 76/023 455/450 |
| 2016/0219541 A1* | 7/2016 | Chatterjee | ......... | H04W 36/0055 |

FOREIGN PATENT DOCUMENTS

| | | |
|---|---|---|
| CN | 103167614 | 6/2013 |
| JP | 2011193375 | 9/2011 |
| JP | 2012507974 | 3/2012 |
| JP | 2012516633 | 7/2012 |
| KR | 10-2011-0083179 | 7/2011 |
| KR | 10-2012-0032313 | 4/2012 |
| WO | 2011130630 | 10/2011 |
| WO | 2012/077971 | 6/2012 |
| WO | 2013/013697 | 1/2013 |
| WO | 2013002688 | 1/2013 |
| WO | 2013062351 | 5/2013 |
| WO | 2013075340 | 5/2013 |

OTHER PUBLICATIONS

Qualcomm Incorporated, "Techniques for D2D Discovery," 3GPP TSG-RAN WG1 #73, R1-132503, May 2013, 7 pages.
The State Intellectual Property Office of the People's Republic of China Application Serial No. 201480039708.6, Office Action dated Nov. 14, 2016, 9 pages.
European Patent Office Application Serial No. 14822192.2, Search Report dated Jan. 27, 2017, 8 pages.
Nokia, "D2D discovery", R1-132317, 3GPP TSG RAN WG1 Meeting #73, May 2013, 5 pages.

\* cited by examiner

FIG. 10 ized with a cell ID.

METHOD AND APPARATUS FOR TRANSMITTING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2014/006309, filed on Jul. 14, 2014, which claims the benefit of U.S. Provisional Application Nos. 61/845,381, filed on Jul. 12, 2013, 61/856,062, filed on Jul. 19, 2013, and 61/872,757, filed on Sep. 1, 2013, the contents of which are all hereby incorporated by reference herein in their entirety.

TECHNICAL FIELD

The present disclosure relates to a wireless communication system and, more particularly, to a method and apparatus for transmitting and receiving a signal using frequency-hopping in device-to-device communication.

BACKGROUND ART

Wireless communication systems have been widely deployed in order to provide various types of communication services such as voice or data services. Generally, a wireless communication system is a multiple access system capable of supporting communication with multiple users by sharing available system resources (bandwidth, transmit power, etc.). Multiple access systems include, for example, a Code Division Multiple Access (CDMA) system, a Frequency Division Multiple Access (FDMA) system, a Time Division Multiple Access (TDMA) system, an orthogonal frequency division multiple access (OFDMA) system, a Single-Carrier Frequency Division Multiple Access (SC-FDMA) system, and a Multi-Carrier Frequency Division Multiple Access (MC-FDMA) system.

A device-to-device (hereinafter abbreviated D2D) communication corresponds to a communication scheme transmitting and receiving audio, data and the like between UEs without passing through an evolved Node B (hereinafter abbreviated eNB) by configuring a direct link between the UEs. The D2D communication can include such a communication scheme as a UE-to-UE communication scheme, a peer-to-peer communication scheme and the like. The D2D communication scheme can be applied to a M2M (machine-to-machine) communication, MTC (machine type communication) and the like.

The D2D communication is considered as a method of solving a burden of an eNB resulted from increasing data traffic. For instance, unlike a legacy wireless communication system, the D2D communication transmits and receives data between devices without passing through an eNB. Hence, the D2D communication can reduce network overload. Moreover, if the D2D communication is introduced, it may be able to expect reduced procedures of an eNB, reduced power consumption of devices participating in the D2D, increased data transmission speed, increased network capacity, load distribution, and enlarged a cell coverage and the like.

DISCLOSURE

Technical Problem

An object of the present invention devised to solve the problem lies in D2D hopping methods used in consideration of an interference situation.

The technical objects that can be achieved through the present invention are not limited to what has been particularly described hereinabove and other technical objects not described herein will be more clearly understood by persons skilled in the art from the following detailed description.

Technical Solution

The object of the present invention can be achieved by providing a method for transmitting a device-to-device (D2D) signal by a first terminal in a wireless communication system, the method including determining a physical resource block through frequency-hopping, and mapping data to the determined physical resource block, wherein, when a second terminal receiving the D2D signal belongs to a second cell different from a first cell including including the first terminal, a hopping offset value common to the first cell and the second cell is used for the frequency-hopping.

In another aspect of the present invention, provided herein is a first terminal for transmitting a device-to-device (D2D) signal in a wireless communication system, the first terminal including a transmission module, and a processor, wherein the processor is configured to determine a physical resource block through frequency-hopping and map data to the determined physical resource block, wherein, when a second terminal receiving the D2D signal belongs to a second cell different from a first cell including including the first terminal, a hopping offset value common to the first cell and the second cell is used for the frequency-hopping.

The above aspects of the present invention may include some or all of the following details.

The common hopping offset value may be a D2D hopping offset, the D2D hopping offset being different from a hopping offset of the first cell and a hopping offset of the second cell.

The common value may be a smaller one of a hopping offset of the first cell and a hopping offset of the second cell.

The common value may be an average of a hopping offset of the first cell and a hopping offset of the second cell.

The frequency-hopping may be subband-based frequency-hopping.

A pseudo-random sequence for determining the hopping function related to an amount of the frequency-hopping may be initialized with a cell ID.

The cell ID may be selected from a set of integers excluding 0 to 509.

When the first terminal is an in-network terminal, the pseudo-random sequence may be initialized with a cell ID value corresponding to a first range, wherein, when the second terminal is an out-of-network terminal, the pseudo-random sequence may be initialized with a value randomly selected from among cell ID values corresponding to a second range.

At least one of the first arrange and the second range does not include a value in the range between 0 and 509.

A value of the cell ID may change when a preset time passes.

A value of the cell ID may change when a negative acknowledgment (NACK) is received a preset number of times or more.

When the first terminal is in an RRC idle state, the hopping offset value may be one of a preset value, a value delivered through a physical layer signal, a value delivered through a higher layer signal and a value delivered through a paging signal.

Identical hopping bandwidths may be configured in the first cell and the second cell.

Advantageous Effects

According to embodiments of the present invention, various kinds of interference and collisions which may occur due to frequency-hopping in D2D communication may be minimized.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc. The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A resource structure/channel.

Figure 1:
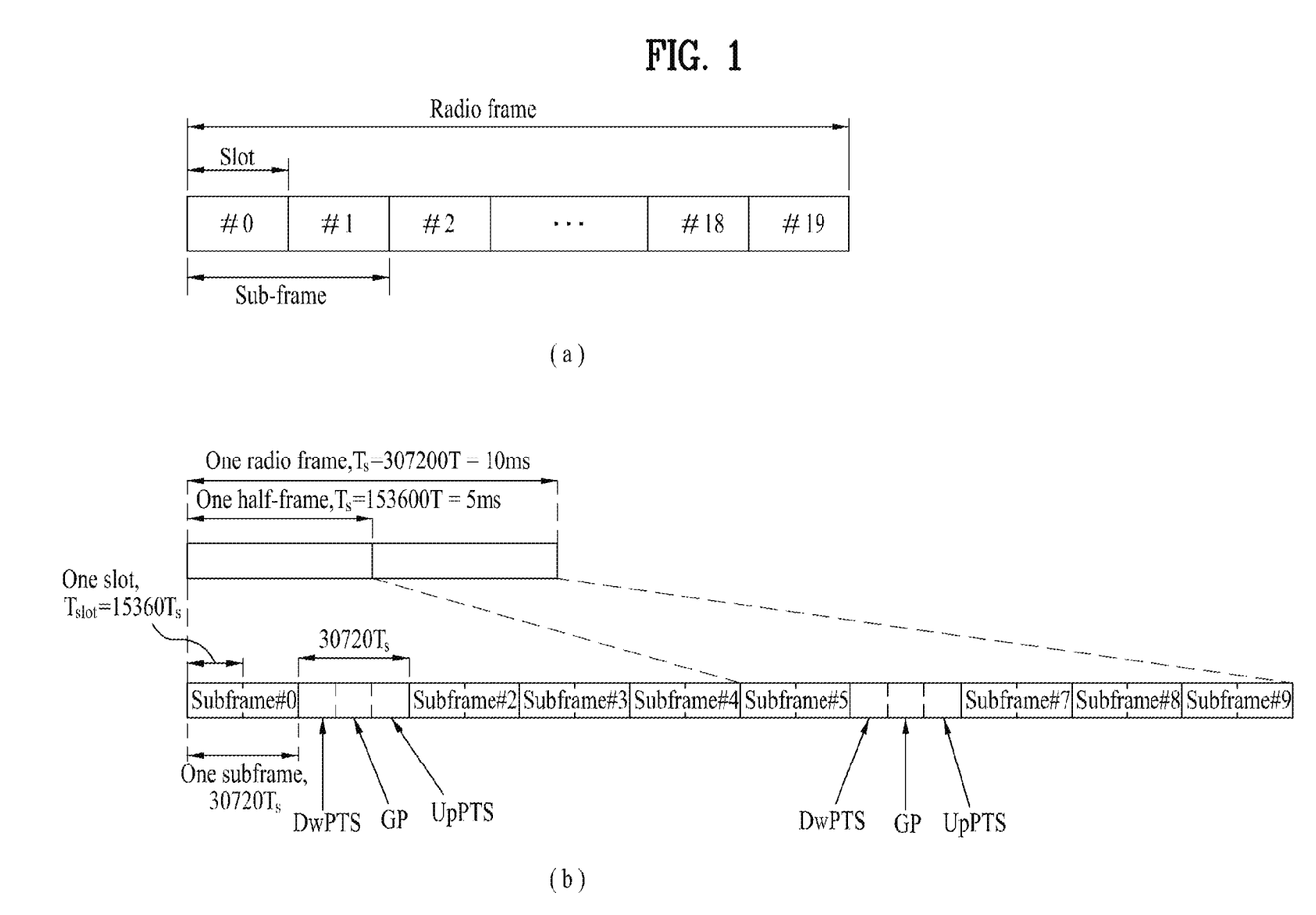
FIG. 1 illustrates the structure of a radio frame.

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
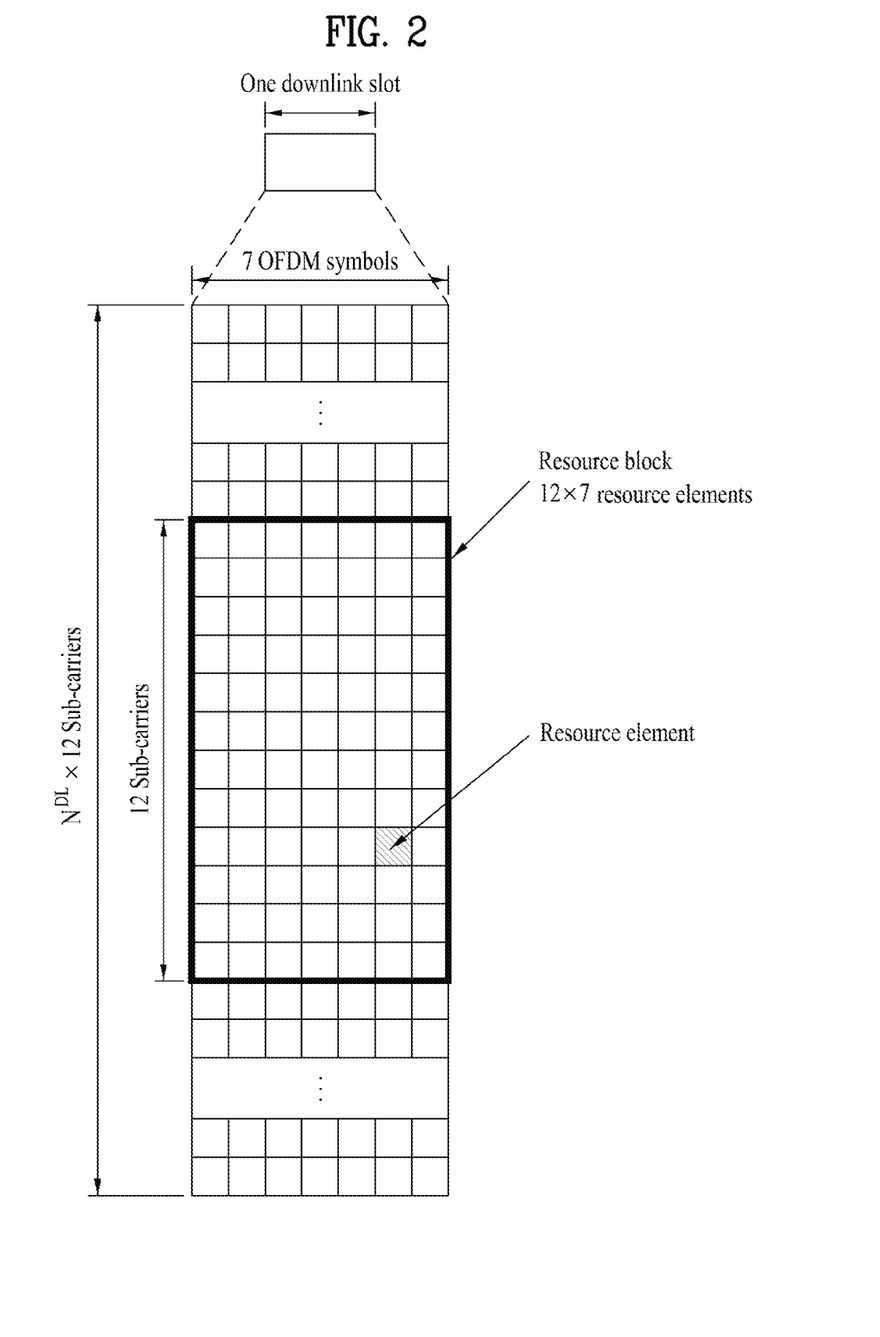
FIG. 2 illustrates a downlink resource grid for one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
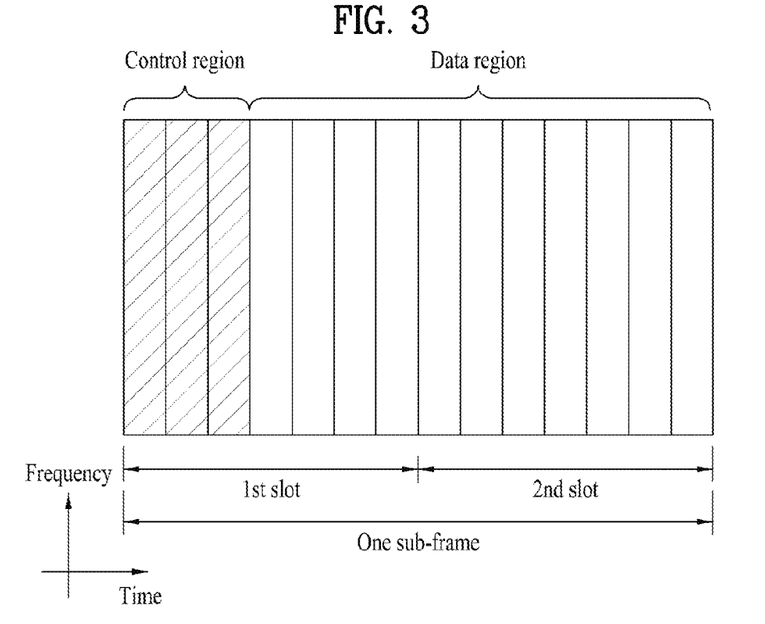
FIG. 3 illustrates the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
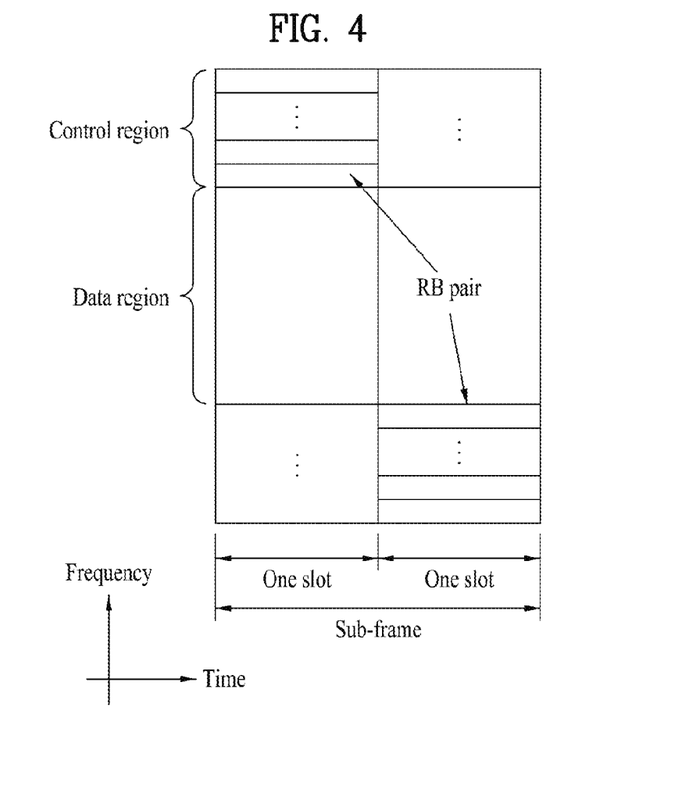
FIG. 4 illustrates the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

PUSCH Hopping

Frequency-hopping may be applied to PUSCH transmission in consideration of frequency diversity. In the LTE/LTE-A system, frequency-hopping is divided into type-1 frequency-hopping and type-2 frequency-hopping. For type-1 frequency-hopping, hopping by ¼× hopping bandwidth, −¼× hopping bandwidth, or ½× hopping bandwidth is determined according to the hopping bits indicated by the uplink grant DCI. Specifically, the lowest PRB index of the first slot is $n_{PRB}^{S1}(i)=RB_{START}$, wherein $RB_{START}$ may be obtained from the uplink grant. Once the lowest PRB index in the first slot is determined, the lowest PRB index in the second slot is determined according to Equation 1 and Table 1 given below.

$$n_{PRB}^{S1}(i)=\tilde{n}_{PRB}^{S1}(i)+\tilde{N}_{RB}^{HO}/2$$

$$n_{PRB}(i)=\tilde{n}_{PRB}(i)+\tilde{N}_{RB}^{HO}/2 \quad \text{Equation 1}$$

In this equation, $N_{RB}^{HO}$ denotes pusch-HoppingOffset. If $N_{RB}^{HO}$ is an odd number, $\tilde{N}_{RB}^{HO}=N_{RB}^{HO}+1$. If $N_{RB}^{HO}$ is an even number, $\tilde{N}_{RB}^{HO}=N_{RB}^{HO}$.

TABLE 1

| System BW $N_{RB}^{UL}$ | Number of Hopping bits | Information in hopping bits | $\tilde{n}_{PRB}(i)$ |
|---|---|---|---|
| 6-49 | 1 | 0 | $(\lfloor N_{RB}^{PUSCH}/2 \rfloor + \tilde{n}_{PRB}^{S1}(i)) \bmod N_{RB}^{PUSCH}$ |
| | | 1 | Type 2 PUSCH Hopping |
| 50-110 | 2 | 00 | $(\lfloor N_{RB}^{PUSCH}/4 \rfloor + \tilde{n}_{PRB}^{S1}(i)) \bmod N_{RB}^{PUSCH}$ |
| | | 01 | $(-\lfloor N_{RB}^{PUSCH}/4 \rfloor + \tilde{n}_{PRB}^{S1}(i)) \bmod N_{RB}^{PUSCH}$ |
| | | 10 | $(\lfloor N_{RB}^{PUSCH}/2 \rfloor + \tilde{n}_{PRB}^{S1}(i)) \bmod N_{RB}^{PUSCH}$ |
| | | 11 | Type 2 PUSCH Hopping |

(In this table, $N_{RB}^{PUSCH}$ denotes the number of PUSCH RBs (the hopping bandwidth).)

Figure 5:
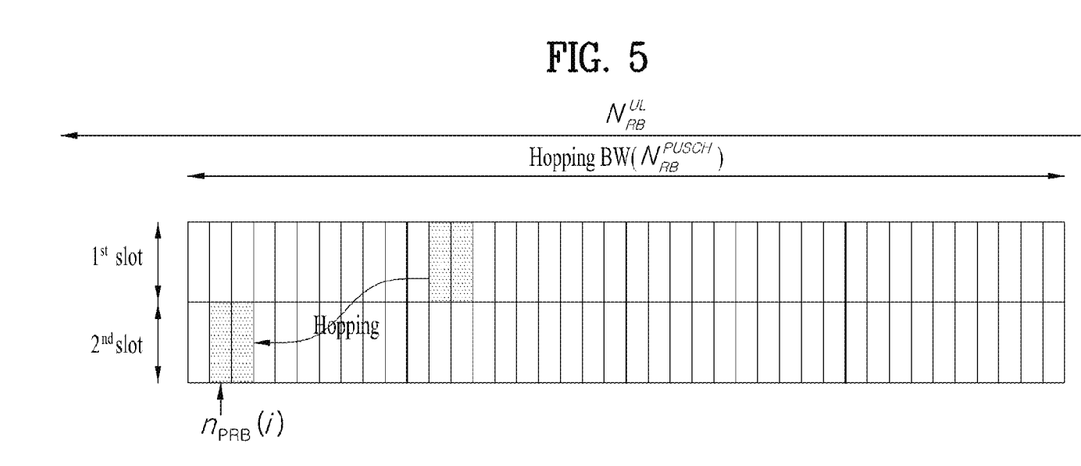
FIGS. 5 and 6 illustrate frequency-hopping.

FIG. 5 illustrates an example of type-1 hopping. In FIG. 5, it is assumed that the hopping bits, consisting of two bits, are 01. Accordingly, $\tilde{n}_{PRB}(i)=(-\lfloor N_{RB}^{PUSCH}/4 \rfloor+\tilde{n}_{PRB}^{S1}(i)) \bmod N_{RB}^{PUSCH}$. According to Equation 1, the lowest PRB index of the second slot which is hopped from the lowest PRB index of the first slot by $\tilde{n}_{PRB}(i)=(-\lfloor N_{RB}^{PUSCH}/4 \rfloor+\tilde{n}_{PRB}^{S1}(i)) \bmod N_{RB}^{PUSCH}$ is $n_{PRB}(i)$.

Type-2 PUSCH hopping is hopping based on a subband. When mirroring is not applied, the lowest PRB index in slot $n_s$ is given by Equation 2.

$$n_{PRB}(n_s) = \begin{cases} \tilde{n}_{PRB}(n_s) & N_{sb}=1 \\ \tilde{n}_{PRB}(n_s) + \lceil N_{RB}^{HO}/2 \rceil & N_{sb}>1 \end{cases} \quad \text{Equation 2}$$

Herein, $N_{sb}$ denotes the number of subbands announced through higher layer signaling, and $\tilde{n}_{PRB}(n_s)$ is given by Equation 3 given below.

$$\tilde{n}_{PRB}(n_s) = (\tilde{n}_{VRB} + f_{hop}(i) \cdot N_{RB}^{sb} + \quad \text{Equation 3}$$
$$((N_{RB}^{sb}-1) - 2(\tilde{n}_{VRB} \bmod N_{RB}^{sb})) \cdot f_m(i)) \bmod (N_{RB}^{sb} \cdot N_{sb})$$

$$i = \begin{cases} \lfloor n_s/2 \rfloor & \text{inter-subframe hopping} \\ n_s & \text{intra and inter-subframe hopping} \end{cases}$$

$$n_{PRB}(n_s) = \begin{cases} \tilde{n}_{PRB}(n_s) & N_{sb}=1 \\ \tilde{n}_{PRB}(n_s) + \lceil N_{RB}^{HO}/2 \rceil & N_{sb}>1 \end{cases}$$

$$\tilde{n}_{VRB} = \begin{cases} n_{VRB} & N_{sb}=1 \\ n_{VRB} - \lceil N_{RB}^{HO}/2 \rceil & N_{sb}>1 \end{cases}$$

wherein the hopping function $f_{hop}(i)$ is given by Equation 4 below.

$$f_{hop}(i) = \quad \text{Equation 4}$$
$$\begin{cases} 0 & N_{sb}=1 \\ \left(f_{hop}(i-1) + \sum_{k=i\cdot 10+1}^{i\cdot 10+9} c(k) \times 2^{k-(i\cdot 10+1)}\right) \bmod N_{sb} & N_{sb}=2 \\ \dfrac{N_{sb}}{\left(f_{hop}(i-1) + \sum_{k=i\cdot 10+1}^{i\cdot 10+9} c(k) \times 2^{k-(i\cdot 10+1)}\right) \bmod N_{sb}} & N_{sb}>2 \\ (N_{sb}-1)+1) \bmod N_{sb} \end{cases}$$

wherein the mirroring function $f_m(i)$ is given by equation 5 below.

$$f_m(i) = \begin{cases} i \bmod 2 & N_{sb}=1 \text{ and intra} \\ & \text{and inter-subframe hopping} \\ \text{CURRENT\_TX\_NB} & N_{sb}=1 \text{ and} \\ \bmod 2 & \text{inter-subframe hopping} \\ c(i \cdot 10) & N_{sb}>1 \end{cases} \quad \text{Equation 5}$$

Herein, $f_{hop}(-1)=0$, and CURRENT_TX_NB denotes the number of transmissions of a transport block. The pseudo-random sequence generation function c(k) is initialized as follows. For a type-1 frame structure, $c_{init}=N_{ID}^{cell}$. For a type-2 frame structure, $c_{init}=2^9 \cdot (n_f \bmod 4) + N_{ID}^{cell}$ at the start of each frame.

That is, type-2 hopping refers to applying the mirroring operation of reversing the order of use of transmission resources within a subband while hopping is performed on a subband basis by the hopping function. Herein, the hopping function is determined by the pseudo-random sequence c(i). The pseudo-random sequence c(i) is a function of cell ID (the mirroring pattern is also a function of cell ID). Accordingly, all UEs in a cell have the same pattern. Cell-specific mirroring may be applied to type-2 hopping.

Figure 6:
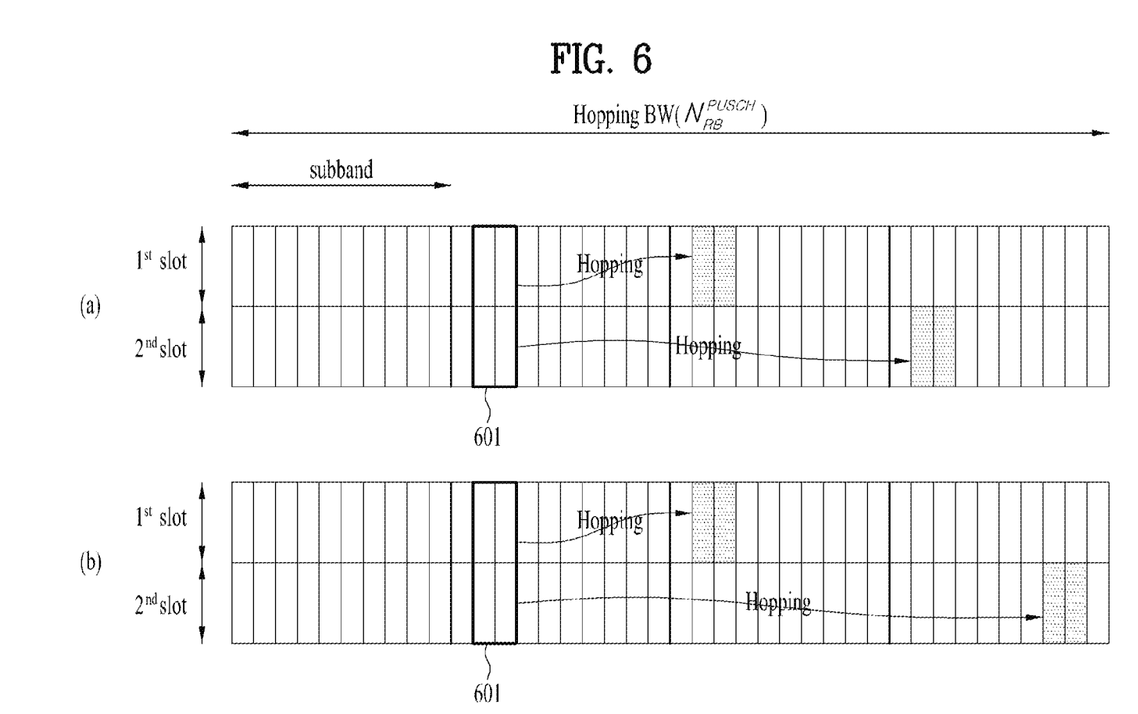

FIG. 6 illustrates an example of type-2 hopping applied when the number of subbands $N_{sb}$ is 4. FIG. 6(a) illustrates hopping performed by one subband with respect to a virtual resource block 601 in the first slot, and hopping performed by two subbands with respect to the virtual resource block 601 in the second slot. FIG. 6(b) illustrates application of the mirroring operation to the second slot.

Figure 7:
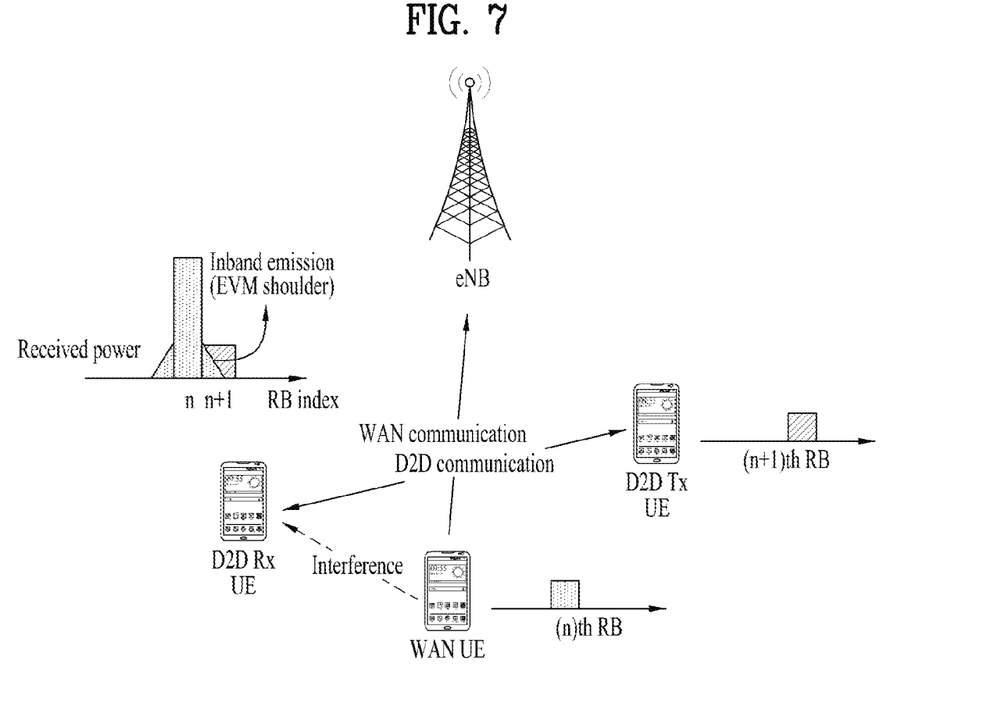
FIGS. 7 and 8 illustrate a communication environment to which an embodiment of the present invention is applicable and a problem related therewith.

Meanwhile, D2D communication is performed using uplink resources. Accordingly, PUSCH hopping of the LTE/LTE-A system described above is applicable to D2D communication (including discovery and communication). However, applying the legacy PUSCH hopping to D2D transmission and reception may cause a problem due to, for example, in-band emission. Referring to FIG. 7, a wide area network (WAN) UE and a D2D Tx UE belong to the same cell. When the WAN UE transmits a signal on the (n)th RB and the D2D Tx UE transmits a signal on the (n+1)th RB, in-band emission of the WAN UE may apply significant interference to transmission and reception of the D2D Tx UE. If type-1 hopping is applied in this situation, hopping is performed in the same RB unit (½*$N_{RB}^{PUSCH}$, ¼*$N_{RB}^{PUSCH}$, −¼*$N_{RB}^{PUSCH}$), and thus the D2D Tx UE continues to be affected by in-band emission of the WAN UE. If type-2 hopping is applied, the WAN UE and the D2D UE which belong to the same cell have the same hopping pattern (particularly, when the UEs use the same sequence) since both the hopping function $f_{hop}(i)$ related to the amount of frequency-hopping and the mirroring function $f_m(i)$ yield cell specific values. Additionally, the value of $N_{RB}^{HO}$ in the hopping function may vary among cells, and an RRC idle UE may not know the hopping pattern. In this case, D2D UEs may attempt to detect a signal of a counterpart UE in an incorrect frequency region. In addition, if the WAN UE is scheduled while a D2D UE is performing hopping in the PUSCH region, the WAN UE may be subjected to interference from the D2D UE. Further, RRC idle UEs may fail to detect a signal in the hopped region as they do not know information such as $n_{PRB}^{S1}(i)=RB_{START}$, $N_{RB}^{PUSCH}$, and $N_{sb}$.

Hereinafter, description will be given of D2D hopping which may address the issues described above. The description given below may be applied to D2D communication including a case where only the PUSCH region is used by D2D UEs.

Suppose that D2D resource allocation is completely controlled by an eNB (e.g., D2D communication controlled by the eNB) or resources for transmission and reception of a discovery signal are designated by the eNB. In this case, if a first UE transmitting a D2D signal and a second UE receiving the D2D signal belong to different cells (a first cell and a second cell, respectively), it is necessary to harmonize frequency-hopping regions. If the frequency-hopping regions of the first UE and the second UE are different from each other, the second UE may accidentally attempt to detect the D2D signal of the first UE in an incorrect region.

To harmonize the D2D resource region (e.g., the discovery frequency resource region) of a cell with the D2D resource region of a neighboring cell, the network may deliver the discovery frequency resource region of the neighboring cell through higher layer/physical layer signaling. Thereby, the D2D UE may recognize the discovery frequency resource region of the neighboring cell. Specifically, in inter-cell D2D communication, when D2D UEs transmit D2D communication requests to the serving cell, UE IDs and/or resource allocation information ($N_{sb}$, $RB_{START}$, $N_{RB}^{HO}$ for each cell, $N_{RB}^{PUSCH}$ for each cell, cell ID, etc.) may be shared among eNBs. $N_{RB}^{HO}$, $N_{RB}^{PUSCH}$ and/or $N_{sb}$ may be predetermined for the neighboring cell. For example, When N cells constitute one cluster, the greatest value, the least value, the greatest common denominator, or the least common multiple of $N_{RB}^{HO}$, $N_{RB}^{PUSCH}$ and $N_{sb}$ of the cells in the cluster and the maximum/minimum number of RBs occupied by a discovery signal may be predetermined as values for the cluster. Alternatively, to arrange D2D resources of all cells in the same region, the cells may be set to have the same value of $N_{RB}^{PUSCH}$.

In order to harmonize frequency-hopping regions, pusch-HoppingOffset $N_{RB}^{HO}$ and/or hopping bandwidth ($N_{RB}^{PUSCH}$) which are common to the first cell and the second cell may be used in applying frequency-hopping. This is particularly intended for a case where the cells are provided with different hopping offsets. Specifically, the greatest one or the least one of the hopping offsets of the first cell and the second cell may be used as the D2D hopping offset. Alternatively, an average of the hopping offsets of the first cell and the second cell may be used.

Alternatively, a separate hopping offset for D2D communication (which may differ from the hopping offsets assigned to the respective cells) may be used. The separate hopping offset for D2D communication may be delivered to the UEs through physical layer/higher layer signaling. For a UE which is incapable of connecting to the network, a predetermined D2D hopping offset/region may be used. Specifically, this operation may be applied to a UE positioned out of coverage. Herein, the D2D hopping offset/region may correspond to a value which the UE has received from the network by accessing the network or a value pre-stored in the UE. The hopping offset for D2D communication may be determined in consideration of: i) interference applied to the PUCCH region by the D2D UE according to in-band emission, ii) a case where the transmission time of a D2D signal is different from that of PDCCH in D2D discovery and thus the whole frequency band is used for transmission of the D2D signal, and iii) a case where a specific PUSCH/PDCCH region is excluded from the D2D hopping region in order to protect the specific PUSCH/PDCCH region in D2D communication/discovery.

An RRC idle UE may recognize $N_{RB}^{HO}$, $N_{RB}^{PUSCH}$ and/or $N_{sb}$ using methods described below. Specific values may be predefined for $N_{RB}^{HO}$, $N_{RB}^{PUSCH}$ and/or $N_{sb}$, or $N_{RB}^{HO}$, $N_{RB}^{PUSCH}$ and/or $N_{sb}$ of a cell which the UE has most recently accessed may be used. Alternatively, a signal indicating $N_{RB}^{HO}$, $N_{RB}^{PUSCH}$ and/or $N_{sb}$ may be broadcast through physical layer/higher layer signaling. In this case, a DCI for D2D broadcast may be used. The DCI for D2D broadcast may be a DCI which can be decoded by all UEs. Alternatively, $N_{RB}^{HO}$, $N_{RB}^{PUSCH}$ and/or $N_{sb}$ may be delivered through a paging signal.

If all D2D UEs are in the RRC connected state, and inter-cell discovery resources are configured on the same time resource, harmonization of the frequency-hopping regions may not be performed. That is, harmonization of the frequency-hopping regions may not be performed only when inter-cell discovery resources are configured on the same time resource. If the cells are assigned discovery resources on different time resources, the resources for discovery may be independently configured. If the inter-cell discovery resources/the amount thereof are independently configured, this should be recognized by UEs of a neighboring cell. To this end, the UEs may attempt to blind-decode the discovery frequency resource region, or the network may deliver the discovery frequency resource region of the neighboring cell through a higher layer/physical layer signal.

Figure 8:
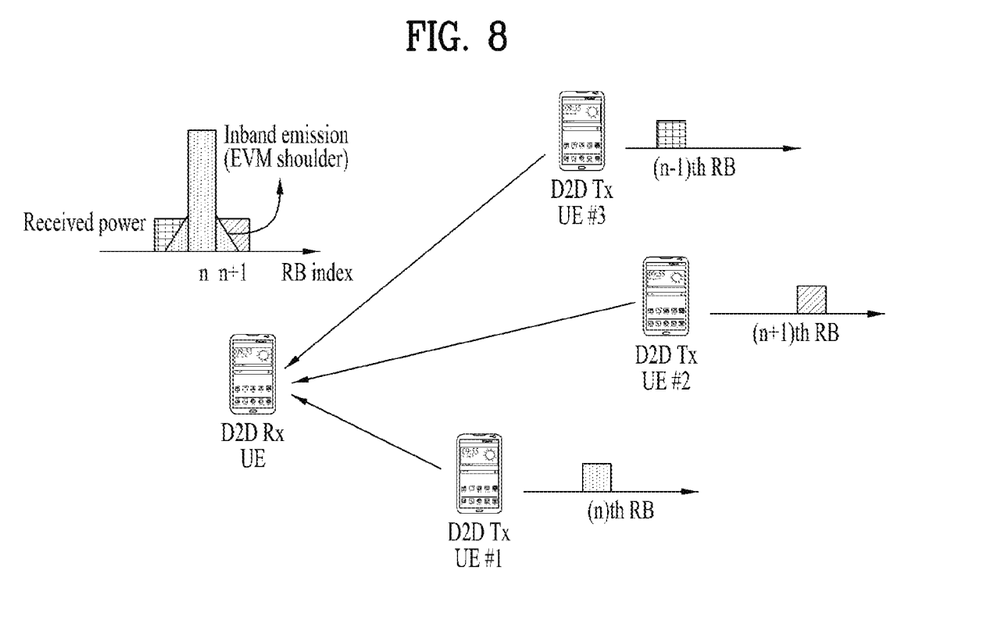
Figure 9:
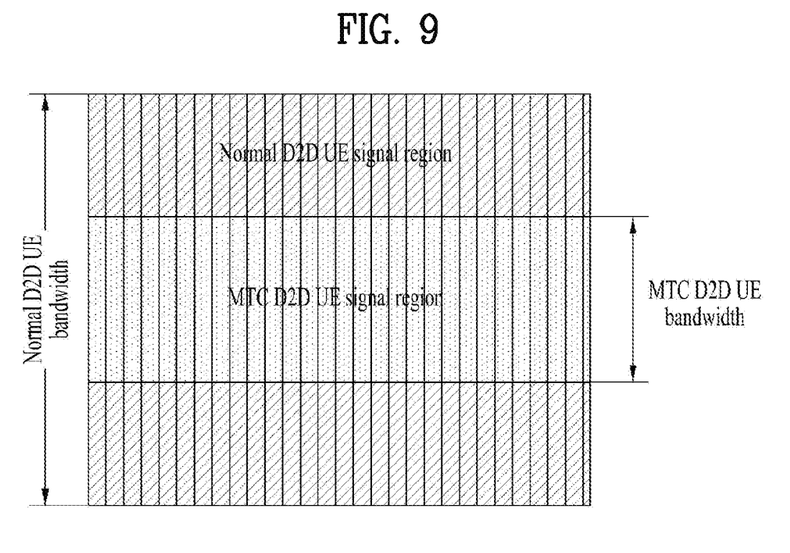
FIG. 9 illustrates a hopping method according to an embodiment of the present invention.

As described above, if $N_{RB}^{HO}$, $N_{RB}^{PUSCH}$ and/or $N_{sb}$ which are common to the first cell and the second cell are used, and thus the first cell and the second cell have the same D2D hopping region, interference according to in-band emission may cause a problem in transmission of signals of D2D UEs (D2D Tx UEs #1 to #3) illustrated in FIG. 8. In another case, if the WAN UE and the D2D UE use the same cell ID to perform frequency-hopping, they may apply interference to each other. Particularly, if a D2D UE performs D2D discovery/communication without being controlled by the eNB, the aforementioned issue may be raised. Hereinafter, methods for addressing the aforementioned issues will be discussed.

A pseudo-random sequence for determining the hopping function and/or the mirroring function (hereinafter, referred to as $f_{hop}(i)$ and $f_m(i)$, respectively) may be initialized with a virtual cell ID rather than a cell ID. Herein, the virtual cell ID may be set to a value delivered through higher layer signaling or, if the RRC idle UE participates in discovery, a predetermined value. UEs of all cells may use the same value as the virtual cell ID.

A seed value for $f_{hop}(i)$ and $f_m(i)$ may be set to a value out of the range between 0 and 503, which is the range of physical cell ID, or the range between 0 and 509, which is the range of virtual cell ID. In other words, $f_{hop}(i)$ and $f_m(i)$ may be initialized with a (cell ID) value selected from an integer set which does not include any value from 0 to 509 (506).

The seed value for $f_{hop}(i)$ and $f_m(i)$ may be changed depending on whether the UE is an in-network UE or an out-of-network UE. This is intended to ensure DMRS pseudo-orthogonality with respect to a D2D UE in a neighboring network. For example, if the first UE is an in-network UE, the pseudo-random sequence for $f_{hop}(i)$ and $f_m(i)$ may be initialized with a cell ID value corresponding to a first range. If the second UE is an out-of-network UE, the pseudo-random sequence may be initialized with a cell ID value corresponding to a second range. Herein, at least one of the first range and the second range may not include any value from 0 to 509 (506). Specifically, the first range may be a range of values of the legacy (virtual) cell ID, and the second range may be a set of values out of the range of values of the legacy (virtual) cell ID. Alternatively, both the first range and the second range may be sets out of the range of the legacy (virtual) cell ID, and may be identical to or different from each other.

When the default value of the seed value for $f_{hop}(i)$ and $f_m(i)$ is fixed to a value (e.g., 510) which is out of the range of the legacy physical cell ID/virtual cell ID, or is selected from a set consisting of values out of the rand of cell ID, the network may configure one value in a region including the range of cell ID.

The seed values of $f_{hop}(i)$ and $f_m(i)$ determined using one of the aforementioned methods may change under a specific condition. For example, the seed value of $f_{hop}(i)$ and $f_m(i)$ may change when a preset time passes. Alternatively, the seed value for a (specific) UE may be changed if signals indicating that the discovery signal has not been received are persistently received, an announcement of reception of the discovery signal is not received, or the number of times of reception of NACK is greater than or equal to a preset number (a NACK counter, which has 0 as the least value, is operated every time NACK is received in a manner that +1 is recorded when NACK is received, and −1 is recorded when ACK is received). Alternatively, all seed values for UEs may change simultaneously when a certain time passes. In this case, the changed seed values may be expressed as $c_{init}=N_{ID}^{cell}$+radio frame number.

Even if $RB_{START}$ is hopped between neighboring UEs, influence of in-band emission may persistently exist. If NACK is persistently received in communication, or if the NACK counter is operated (in a manner that +1 is recorded when NACK is received, and −1 is recorded when ACK is received with 0 set as the least value for the counter) every time NACK is received, and thus the value of the counter exceeds a specific threshold, $RB_{START}$ may be changed. Alternatively, $RB_{START}$ may be changed when a preset time passes. This operation may be selectively applied to a specific UE, or may be applied to all UEs. The value obtained after $RB_{START}$ is changed may be ($RB_{START}$+random number)mod(the number of PUSCH RBs).

$f_{hop}(i)$ and $f_m(i)$ may be configured to be cell-specific in relation to UE ID. Hereinafter, specific methods thereof will be discussed.

A seed value of $f_{hop}(i)$ and $f_m(i)$ may be configured by a UE ID. To maintain pseudo-orthogonality with the legacy PUSCH hopping pattern, the seed value of $f_{hop}(i)$ and $f_m(i)$, which differs among UEs, may be selected in a region out of the range of a physical/virtual cell ID. In this case, the D2D hopping pattern may maintain pseudo-orthogonality with the hopping pattern of the WAN UE.

When UE IDs are used as seeds, UE IDs bringing up the same value in modulo operation may compute the same hopping pattern. Thereby, persistent interference may be caused. Accordingly, $RB_{START}$ may be changed after a certain time. This operation may be selectively applied to a specific UE or applied to all UEs. The value obtained through the change may be ($RB_{START}$+random number)mod (the number of PUSCH RBs). The seed value of $f_{hop}(i)$ and $f_m(i)$ may be set to change when a preset time passes. Alternatively, the seed value for a (specific) UE may be changed if signals indicating that the discovery signal has not been received are persistently received, if an announcement of reception of the discovery signal is not received, or if the number of times of reception of NACK is greater than or equal to a preset number (a NACK counter, which has 0 as the least value, is operated every time NACK is received in a manner that +1 is recorded when NACK is received, and −1 is recorded when ACK is received). Alternatively, all seed values for UEs may change simultaneously when a certain time passes. In this case, the changed seed values may be expressed as $c_{init}N_{ID}^{cell}$+radio frame number.

$RB_{START}$ may be i) obtained from the UE ID through hashing, e.g., (UE ID) modulo (number of RB), or ii) determined to be a position where least interference is applied as a result of measurement of the degree of interference. Alternatively, the amount of interference may be measured for respective subbands, and then a position where the smallest amount of interference is applied may be determined as the starting position of a subband, and an RB derived from the UE ID within the subband may be determined as $RB_{START}$. Alternatively, iii) if the eNB directly designates a D2D signal transmission resource, the eNB may indicate $RB_{START}$ through a physical layer signal or a higher layer signal.

The number of subbands $N_{sb}$ and the number of RBs in a subband $N_{RB}^{sb}$ may be multiples of a basic unit of resources occupied by a discovery signal of a UE. For example, when the discovery signal of a UE occupies 2 RBs in the frequency domain, the number of RBs in a subband may be 2 RBs, 4 RBs, 6 RBs, or 8 RBs . . . . The number of subbands for the discovery signal may be predetermined. For D2D communication (except for discovery), the number of subbands may be predetermined. That is, the number of subbands for the discovery signal may differ from the number of subbands for D2D communication. In addition, in D2D discovery or D2D communication, the number of subbands configured when the eNB directly indicates a transmission resource may be different from the number of subbands configured when a UE directly determines a transmission resource. For example, in D2D communication, when the eNB directly indicates the position of a transmission resource, the number of subbands may be set to 1. In this case, mirroring may be applied. Herein, the mirroring pattern may be determined by a cell ID or a predetermined ID, or may be configured by alternating 0 and 1 for respective SFs. That is, the positions of resources hopped for respective SFs are reversed with respect to center frequency. This hopping pattern is similar to the hopping of the PUSCH from one end of a bandwidth to the other end of the bandwidth. In this pattern, hopping is performed as the position of a transmission resource is reversed with respect to the center RB within the PUSCH region according to $n_{VRB}$. This hopping pattern may be referred to as a PUCCH-like hopping pattern. This hopping pattern makes the legacy LTE-PUSCH regions consecutive, thereby maintaining frequency continuity in assigning resources when the eNB schedules PUSCH (namely, the hopping pattern makes LTE PUSCH regions consecutive in the middle of a band. This is because resource allocation for PUSCH needs to be performed on the consecutive RBs (for a UE which is not allowed to perform multi-cluster transmission) as good PAPR characteristics are ensured only when SC-FDMA continuously performs resource allocation). In the PUCCH-like hopping pattern (the hopping pattern for which $N_{sb}=1$ and only mirroring is applied), $n_{VRB}$ may be set in a D2D grant if the eNB directly determines a D2D transmission resource, or may be set by a UE if the UE directly determines a D2D transmission resource.

Frequency-hopping described above may be used on RBs except RBs used by the WAN UE. If the WAN UE performs transmission on an RB right next to a hopped D2D RB, a preconfigured MPR may be applied. If the D2D UE receives resource allocation information (a scheduling map (SM)) of a neighboring WAN UE, only RBs available to the D2D UE in the SM may be configured as resources on which hopping is possible when hopping region configuration virtual RBs are mapped to physical RBs based on the SM.

Hereinafter description will be given of a hopping method used when the MTC is used, namely a hopping method for an MTC UE, which is a low-cost D2D UE. When a normal D2D UE and an MTC UE coexist in a cell, collision may occur in performing frequency-hopping if the hopping bandwidth used by the MTC D2D UE (MTC D2D UE bandwidth) is different from the bandwidth used by the normal D2D UE (normal D2D UE bandwidth).

According to a method to address this collision, the MTC D2D UE may configure a hopping bandwidth thereof such that the hopping bandwidth is identical to that of the normal D2D UE, and may perform transmission only when the RB is within the MTC bandwidth after hopping is applied. In this case, a hopping pattern identical to that of the normal D2D UE may be used. In this case, however, the MTC D2D UE may miss a corresponding opportunity to transmit a signal, and thus time taken for discovery may increase by the MTC bandwidth/system bandwidth on average.

Alternatively, the MTC D2D UE may set the hopping bandwidth thereof to the MTC bandwidth. In this case, the MTC D2D UE may never miss an opportunity to transmit a discovery signal. However, collision may occur between transmission of the normal D2D UE and hopping within the MTC bandwidth.

After the MTC D2D UE configures a hopping pattern by setting the hopping pattern thereof to be identical to that of the normal D2D UE, the MTC D2D UE may perform projection into the MTC bandwidth if an RB after application of hopping is out of the MTC bandwidth. For example, the modulo operation may be applied to the hopping pattern of the MTC D2D UE such that the result from the modulo operation is within the hopping bandwidth of the MTC D2D UE. In this case, for the discovery signal, the transmission probability in a range of out of the hopping bandwidth of the MTC D2D UE may be lowered in order to reduce the probability of collision with other UEs. In an extreme case, transmission probability may be set to 0 in the range out of the MTC bandwidth.

The MTC D2D UE may have only one frequency-hopping seed, but may allocate multiple initial positions (RB-$_{START}$). Thereby, the MTC D2D UE may transmit a discovery signal only when the RB is within the MTC bandwidth. That is, one MTC UE may reserve multiple hopping patterns, and may reduce loss of transmission opportunities by performing transmission only when a hopping pattern is within the MTC bandwidth.

In another example, the hopping bandwidth of the MTC D2D UE may be set to be identical to that of the normal D2D UE, and only the hopping pattern which is within the MTC bandwidth may be used among the hopping patterns according to multiple seeds.

A region used by the MTC UE may be excluded from a region in which the normal D2D UE performs hopping. For example, N RBs (N may be less than the MTC bandwidth) may be excluded from the hopping region (a region where the normal D2D UE is capable of performing transmission). In this case, the normal D2D UE may perform reception on an RB used by the MTC UE, but cannot transmit either data or a discovery signal on the RB. The RB used by the MTC UE may be pre-signaled from the network to the D2D UE through a physical layer/higher layer signal. The network may adjust the number of RBs on which transmission from the normal D2D UE is restricted, according to the proportion of the MTC UEs in a cell. As the transmission region for the MTC UE is separated from the transmission region for the normal D2D UE described above, the MTC UE may be prevented from missing an opportunity to transmit a discovery signal or colliding with the normal D2D UE in hopping.

As described above, various hopping methods such as type-1 hopping, type-2 hopping and slot hopping may be used for hopping of the MTC UE. In addition, if the MTC D2D UEs do not always use the MTC bandwidth with respect to the center frequency, the MTC D2D UEs may be grouped to distribute the frequency region used by the MTC D2D UEs. Thereby, possibility of collision with the normal D2D UE may be distributed when the MTC D2D UEs use a specific frequency resource.

Figure 10:
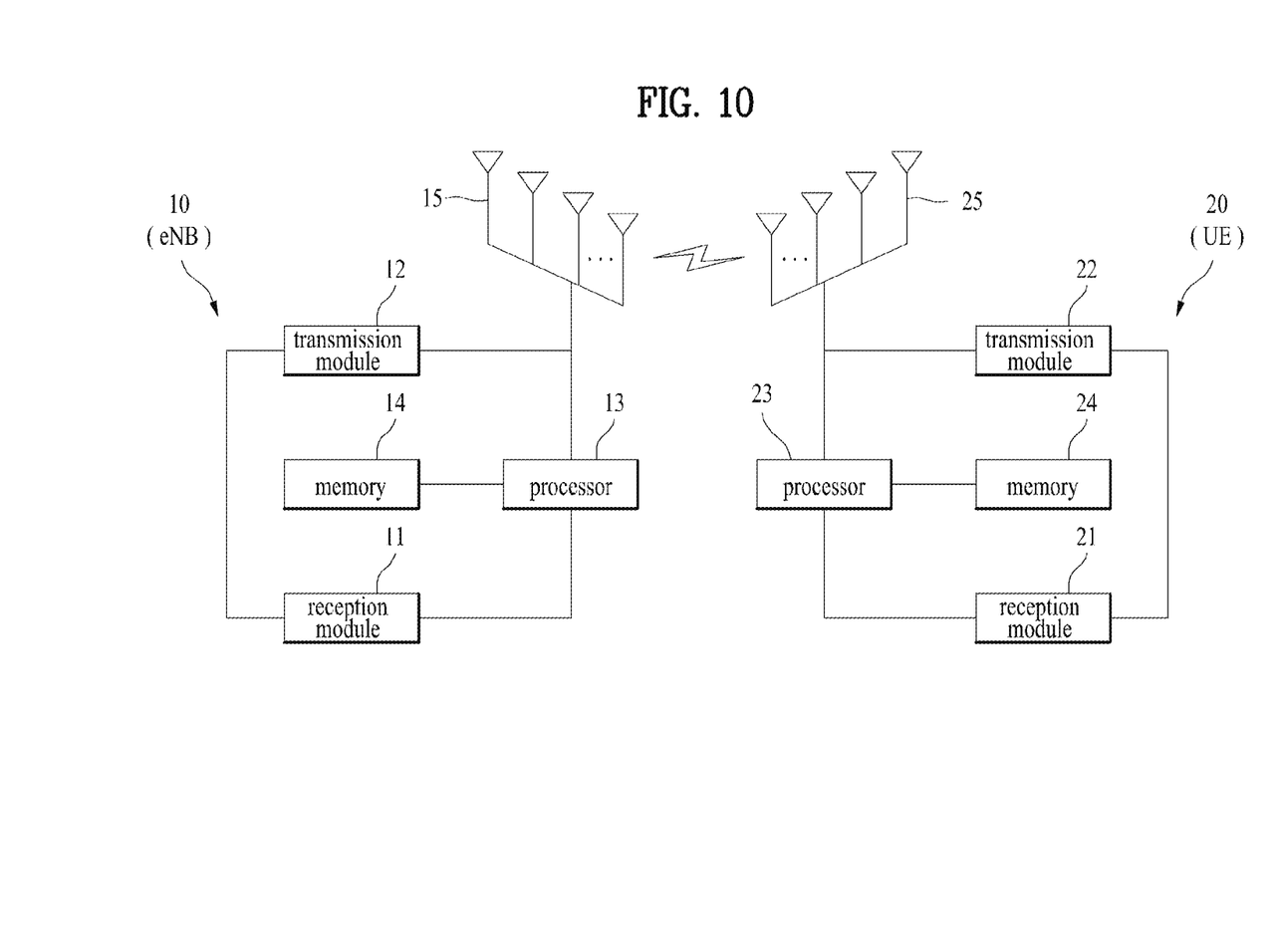
FIG. 10 illustrates configuration of transmission and reception apparatuses.

Configuration of Apparatuses According to an Embodiment of the Present Invention FIG. 10 is a diagram illustrating the construction of a transmission point apparatus and a UE apparatus according to an embodiment of the present invention.

Referring to FIG. 10, a transmission point apparatus 10 according to the present invention may include a reception (Rx) module 11, a transmission (Tx) module 12, a processor 13, a memory 14, and a plurality of antennas 15. The plurality of antennas 15 indicates a transmission point apparatus for supporting MIMO transmission and reception. The Rx module 11 may receive a variety of signals, data, and information on UL from the UE. The Tx module 12 may transmit a variety of signals, data, and information on DL to the UE. The processor 13 may control overall operation of the transmission point apparatus 10.

The processor 13 of the transmission point apparatus 10 according to one embodiment of the present invention may operate to perform the above-mentioned embodiments.

The processor 13 of the transmission point apparatus 10 processes information received at the transmission point apparatus 10 and transmission information to be externally transmitted. The memory 14 may store the processed information for a predetermined time. The memory 14 may be replaced with a component such as a buffer (not shown).

Referring to FIG. 10, a UE apparatus 20 may include an Rx module 21, a Tx module 22, a processor 23, a memory 24, and a plurality of antennas 25. The plurality of antennas 25 indicates a UE apparatus supporting MIMO transmission and reception. The Rx module 21 may receive downlink signals, data, and information from the eNB. The Tx module 22 may transmit UL signals, data, and information to the eNB. The processor 23 may control overall operation of the UE apparatus 20.

The processor 23 of the UE apparatus 20 according to one embodiment of the present invention can operate to perform the above-mentioned embodiments.

The processor 23 of the UE apparatus 20 processes information received at the UE apparatus 20 and transmission information to be externally transmitted. The memory 24 may store the processed information for a predetermined time. The memory 24 may be replaced with a component such as a buffer (not shown).

The specific configurations of the transmission point apparatus and the UE apparatus may be implemented such that the various embodiments of the present invention are independently performed or two or more embodiments of the present invention are simultaneously performed. Redundant matters will not be described herein for clarity.

The description of the transmission point apparatus 10 shown in FIG. 10 may be identically applied to a relay node acting as a DL transmission entity or UL reception entity and the description of the UE apparatus 20 may be identically applied to the relay node acting as a DL reception entity or a UL transmission entity.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the exemplary embodiments of the present invention is given to enable those skilled in the art to realize and implement the present invention. While the present invention has been described referring to the exemplary embodiments of the present invention, those skilled in the art will appreciate that many modifications and changes can be made to the present invention without departing from the scope of the present invention. For example, the constructions of the above-described embodiments of the present invention may be used in combination. Therefore, the present invention is not intended to be limited to the embodiments disclosed herein but is to give a broadest range matching the principles and new features disclosed herein.

The present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. The present invention is not intended to limit the embodiments disclosed herein but is to give a broadest range matching the principles and new features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The above-described embodiments of the present invention are applicable to various mobile communication systems.

What is claimed is:

1. A method for transmitting a device-to-device (D2D) signal by a first terminal in a wireless communication system, the method comprising:
   determining a physical resource block via frequency-hopping; and
   mapping data to the determined physical resource block,
   wherein a common hopping offset value common to a first cell including the terminal and a second cell different from the first cell is used for the frequency-hopping when a second terminal receiving the D2D signal belongs to the second cell.

2. The method according to claim 1, wherein the common hopping offset value is a D2D hopping offset different from a hopping offset of the first cell and a hopping offset of the second cell.

3. The method according to claim 1, wherein the common hopping offset value is a smaller of a hopping offset of the first cell and a hopping offset of the second cell.

4. The method according to claim 1, wherein the common hopping offset value is an average of a hopping offset of the first cell and a hopping offset of the second cell.

5. The method according to claim 1, wherein the frequency-hopping is subband-based frequency-hopping.

6. The method according to claim 5, wherein a pseudo-random sequence for determining a hopping function related to an amount of the frequency-hopping is initialized with a cell ID.

7. The method according to claim 6, wherein the cell ID is selected from a set of integers that does not include 0 to 509.

8. The method according to claim 6, wherein:
   the cell ID corresponds to a first range when the first terminal is an in-network terminal; and
   the cell ID is randomly selected from cell ID values corresponding to a second range when the second terminal is an out-of-network terminal.

9. The method according to claim 8, wherein at least the first range or the second range does not include a value between 0 and 509.

10. The method according to claim 6, wherein a value of the cell ID changes after a preset time.

11. The method according to claim 6, wherein the cell ID changes when a negative acknowledgment (NACK) is received at least a preset number of times.

12. The method according to claim 1, wherein the common hopping offset value is a preset value, a value delivered via a physical layer signal, a value delivered via a higher layer signal or a value delivered via a paging signal when the first terminal is in an RRC (Radio Resource Control) idle state.

13. The method according to claim 1, wherein identical hopping bandwidths are configured in the first cell and the second cell.

14. A first terminal for transmitting a device-to-device (D2D) signal in a wireless communication system, the first terminal comprising:
   a transmission device configured to transmit data; and
   a processor configured to determine a physical resource block via frequency-hopping and map data to the determined physical resource block for data transmission via the transmission device, wherein a common hopping offset value common to a first cell including the terminal and a second cell different from the first cell is used for the frequency-hopping when a second terminal receiving the D2D signal belongs to the second cell.

\* \* \* \* \*